(12) United States Patent
Mataele et al.

(10) Patent No.: US 11,400,777 B2
(45) Date of Patent: Aug. 2, 2022

(54) TOWING ATTACHMENT ASSEMBLY

(71) Applicant: Tongue Less LLC, Jonesboro, GA (US)

(72) Inventors: Siosaia Mataele, Jonesboro, GA (US); Cody Hall, Atlanta, GA (US)

(73) Assignee: Tongue Less LLC, Jonesboro, GA (US)

( * ) Notice: Subject to any disclaimer, the term of this patent is extended or adjusted under 35 U.S.C. 154(b) by 1 day.

(21) Appl. No.: 16/944,981

(22) Filed: Jul. 31, 2020

(65) Prior Publication Data
US 2021/0031576 A1  Feb. 4, 2021

Related U.S. Application Data

(60) Provisional application No. 62/882,389, filed on Aug. 2, 2019.

(51) Int. Cl.
| | | |
|---|---|---|
| *B60D 1/155* | (2006.01) | |
| *B60D 1/40* | (2006.01) | |
| *B60D 1/52* | (2006.01) | |
| *B60D 1/06* | (2006.01) | |

(52) U.S. Cl.
CPC ............ *B60D 1/155* (2013.01); *B60D 1/40* (2013.01); *B60D 1/52* (2013.01); *B60D 1/06* (2013.01)

(58) Field of Classification Search
CPC ............. B60D 1/55; B60D 1/40; B60D 1/52
See application file for complete search history.

(56) References Cited

U.S. PATENT DOCUMENTS

| | | | | |
|---|---|---|---|---|
| 4,468,046 A | * | 8/1984 | Rutherford | B62C 1/06 280/137.501 |
| 4,978,133 A | * | 12/1990 | Thorne | B60D 1/07 267/138 |
| 6,241,271 B1 | | 6/2001 | Belinky | |
| 6,332,626 B1 | | 12/2001 | Morrill | |
| 6,536,794 B2 | | 3/2003 | Hancock et al. | |
| 6,601,867 B2 | * | 8/2003 | Carty | B60D 1/065 280/483 |
| 6,951,346 B2 | * | 10/2005 | Brackett | B60D 1/075 280/422 |
| 7,059,626 B2 | * | 6/2006 | Koch | B62D 63/061 280/38 |
| 7,090,238 B1 | * | 8/2006 | Moore | B60D 1/145 280/507 |
| 7,543,842 B1 | * | 6/2009 | Fiorini | B62B 3/025 280/43 |

(Continued)

FOREIGN PATENT DOCUMENTS

| | | |
|---|---|---|
| AU | 2017261516 B1 | 2/2018 |
| EP | 2289717 B1 | 9/2012 |

*Primary Examiner* — Kevin Hurley
(74) *Attorney, Agent, or Firm* — Alston & Bird LLP

(57) ABSTRACT

A towing attachment assembly, a method of using the towing attachment assembly, and a removable towing coupler are provided. The towing attachment assembly comprising: a removable towing coupler, the removable towing coupler defining a hitch receiver end and a hitch coupling end, and wherein the hitch coupling end comprises a selectively dis-engageable coupling mechanism configured to be selectively dis-engaged from the removable towing coupler and to be coupled with a trailer hitch of a towing vehicle; and a towing coupler lock that secures the hitch receiver end within the hitch receiver.

19 Claims, 10 Drawing Sheets

(56) References Cited

U.S. PATENT DOCUMENTS

| | | | |
|---|---|---|---|
| 7,651,117 B1* | 1/2010 | McGee | B62D 63/061 |
| | | | 280/656 |
| 9,290,071 B2 | 3/2016 | McCoy et al. | |
| 9,809,072 B2* | 11/2017 | Beck | B60S 9/22 |
| 10,112,451 B2 | 10/2018 | Mikesell et al. | |
| 10,603,967 B2* | 3/2020 | Shaffer | B60D 1/06 |
| 2019/0217676 A1 | 7/2019 | Blackwell | |

* cited by examiner

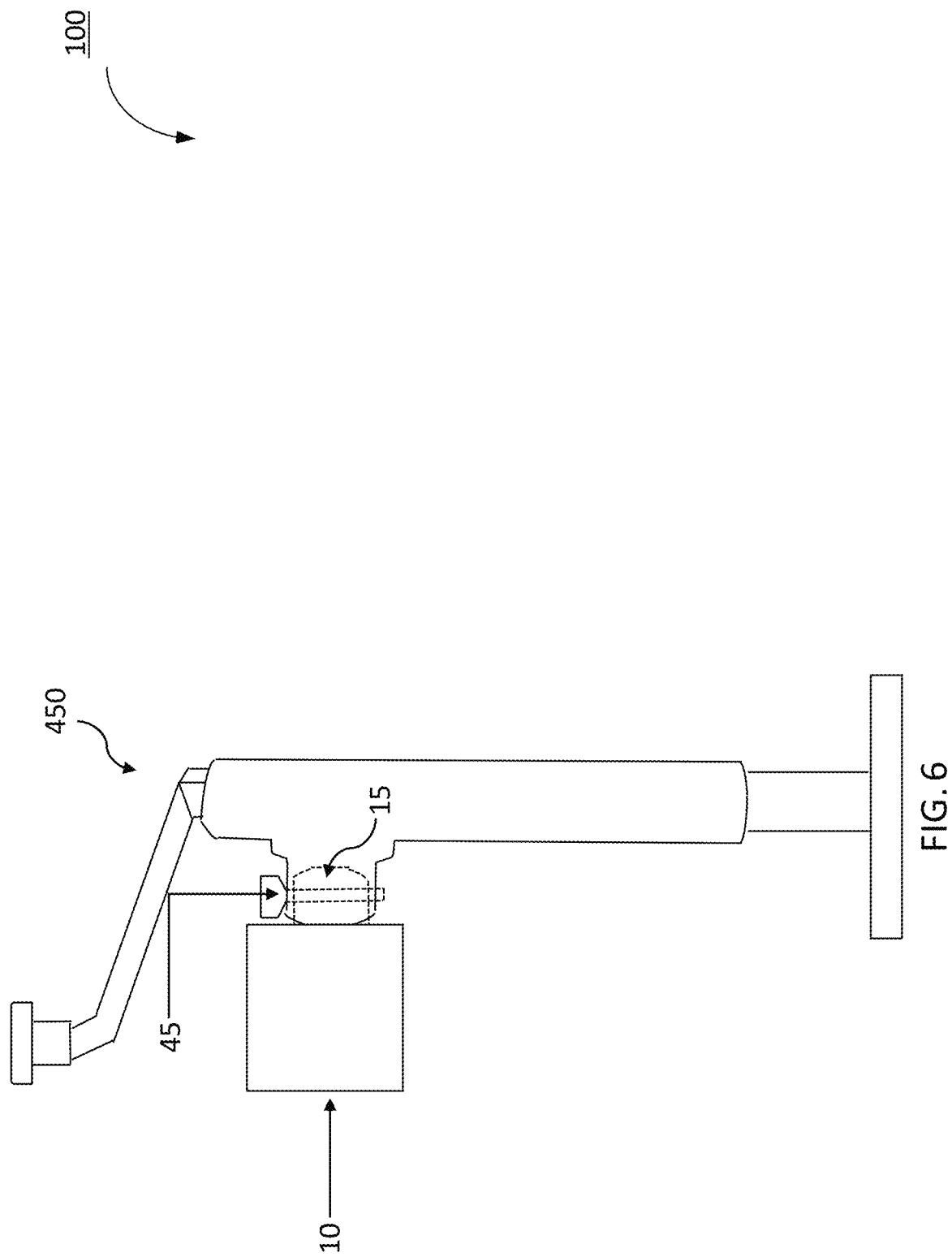

TOWING ATTACHMENT ASSEMBLY

CROSS-REFERENCE TO RELATED APPLICATION

This application claims priority to and the benefit of U.S. Provisional Application No. 62/882,389, filed Aug. 2, 2019, the entire contents of which as are hereby incorporated by reference herein.

BACKGROUND

Related Field

The present invention relates generally to towing equipment and apparatus. More specifically, the present invention relates to trailer hitch apparatuses.

Related Art

Conventional trailer hitches are deficient with regard to security measures and space requirements. Conventional trailer hitches typically provide security measures consisting of mating components. For example, the towed vehicle may have a fixed ball hitch receiver meant to mate with a ball hitch attached to the towing vehicle. An insert may be placed within the ball hitch receiver to deter unwanted mating. However, a conventional trailer hitch can still be stolen if there is no insert within the ball hitch receiver or it is removed. Likewise, mating components may be irregularly shaped totems meant to mate with one another in order to lock and unlock a conventional trailer hitch. These irregularly shaped mating components are meant to discourage theft or unwanted coupling of a towed vehicle. However, a conventional trailer hitch employing a mating component security scheme can still be stolen if the thief possesses the commensurate mating component. Therefore, there is a need for a towing attachment assembly having more fortified security measures. The present invention is preferable over conventional trailer hitches, as it employs two levels of protection. A removable towing coupler that when removed does not allow coupling of the towing and towed vehicles, and a locking mechanism that allows for complete lockout of the towed vehicle hitch receiver such that there can be no unwanted coupling. Thus, the present invention provides greater security and eases the user's fears of unwanted coupling and theft of the trailer hitch.

Another benefit of the present invention over conventional trailer hitches is its configurability. Conventional trailer hitches are also deficient in that they comprise fixed components, providing little or no user options as to configurability. In FIG. 1, it can be seen that the conventional trailer hitch 1000 is fixed to a towing vehicle such that it cannot be removed when the towed vehicle is parked or decoupled from the towing vehicle. The conventional trailer hitch 1000 of FIG. 1 employs fixed components having the non-configurable dimensions to engage the hitch coupler of the towing vehicle to the towed vehicle. However, when decoupled, the conventional trailer hitch 1000 still necessitates the same large spatial footprint. Such a configuration as that depicted in FIG. 1 is very inefficient when the conventional trailer hitch 1000 is not in use and requires significantly more space to store the trailer when not in use. Thus, conventional trailer hitches are typically deficient with regard to portability and compact-ability. For example, in Applicant's experience, there is often little or no maneuverability when attempting to couple two vehicles with a conventional trailer hitch. Indeed, conventional trailer hitches create a relatively large spatial footprint of the towed vehicle. Therefore, there is a need for a removable towing hitch assembly comprising interchangeable and configurable components rather than fixed components.

The present invention allows for wider array of potential towing configurations over conventional trailer hitches. To this end, the towing attachment assembly of the present invention can be configured in any spatial direction. This broader array of towing configurations allows more flexibility in how the towed and towing vehicles are coupled. Thus, there are fewer situations wherein there is no suitable towing configuration. Further, the towing attachment assembly of the present invention may be configured to a more advantageous length. Therefore, the present invention is advantageous over conventional trailer hitches because of its reduced spatial footprint when uncoupled. This reduced spatial footprint simplifies storage of the towed vehicle while not in use, decreases storage and lot costs that may be related to the size of the towed vehicle, and simplifies access to the towed vehicle.

BRIEF SUMMARY

A towing attachment assembly and methods for using a towing attachment assembly are disclosed.

In accordance with one aspect, a towing attachment assembly is provided. The towing attachment assembly of various embodiments comprises a removable towing coupler. The removable towing coupler of various embodiments defines a hitch receiver end and a hitch coupling end. The hitch receiver end of various embodiments is configured to be removably nested within a hitch receiver of a towed vehicle, and defines a set of towing coupler openings. The set of towing coupler openings of various embodiments align with a set of hitch receiver openings when the hitch receiver end is nested within the hitch receiver of the towed vehicle, and receive a towing coupler lock therethrough when aligned with the set of hitch receiver openings. The hitch coupling end of various embodiments comprises a selectively dis-engageable coupling mechanism. The selectively dis-engageable coupling mechanism of various embodiments is configured to be selectively dis-engaged from the removable towing coupler and to be coupled with a trailer hitch of a towing vehicle. The removable towing coupler of various embodiments comprises a towing coupler lock that secures the hitch receiver end within the hitch receiver. The towing coupler lock of various embodiments comprises a hitch pin that is inserted within the set of towing coupler openings and the set of hitch receiver openings when the set of towing coupler openings and the set of hitch receiver openings are aligned. The towing coupler lock comprises a locking portion that engages the hitch pin such that the hitch pin cannot be removed from the set of towing coupler openings and the set of hitch receiver openings without first disengaging the locking portion.

In some embodiments, the locking portion is a locking clip that engages a groove defined on the hitch pin such that the hitch pin cannot be removed from the set of hitch receiver openings and the set of towing coupler openings without first disengaging the locking portion.

In some embodiments, the locking portion is a keyed lock that engages a groove defined on the hitch pin such that the hitch pin cannot be removed from the set of hitch receiver openings and the set of towing coupler openings without first disengaging the locking portion.

In some embodiments, the towing coupler lock is inserted within the set of hitch receiver openings while the hitch receiver is evacuated in order to prevent insertion of a towing apparatus within the hitch receiver.

In some embodiments, the selectively dis-engageable coupling mechanism is chosen from the group consisting of a ball hitch, a pintle hitch, a weight distribution hitch, a gooseneck hitch, and a 5$^{th}$ wheel hitch.

In some embodiments, the set of towing coupler openings extends along at least a majority of a length of the removable towing coupler, thereby allowing a user to alter a relative length of the removable towing coupler.

In some embodiments, the towing attachment assembly further comprises a couplable jack receiving portion, wherein the couplable jack receiving portion receives a couplable jack and is oriented intermediate to the hitch receiver end and the hitch coupling end and extends outwardly from a lateral aspect of the removable towing coupler.

In some embodiments, the towing attachment assembly further comprises a couplable jack that is removably coupled to the removable towing coupler.

In some embodiments, the towing attachment assembly further comprises a couplable jack lock that secures the couplable jack to the removable towing coupler.

In some embodiments, the couplable jack is selectively rotatable when the couplable jack is coupled to the removable towing coupler.

In some embodiments, the couplable jack is selectively rotatable in a range of at least 180° relative to the removable towing coupler.

In some embodiments, the couplable jack is selectively anchorable in at least one orientation of 0°, 90°, or 180° relative to the removable towing coupler.

In accordance with one aspect, a method of using a towing attachment assembly is provided that includes the steps of aligning a hitch receiver end of a removable towing coupler with a hitch receiver of a towed vehicle such that the removable towing coupler may be nested within the hitch receiver. The method further includes inserting the hitch receiver end of the removable towing coupler into the hitch receiver of the towed vehicle so that the hitch receiver end is removably nested within the hitch receiver of the towed vehicle, and so that a set of towing coupler openings defined by the removable towing coupler are aligned with a set of hitch receiver openings defined by the hitch receiver. The method further includes inserting a towing coupler lock within the set of towing coupler openings and the set of hitch receiver openings, when the set of towing coupler openings and the set of hitch receiver openings are aligned, in order to secure the hitch receiver end within the hitch receiver.

In some embodiments, the method further comprises the step of inserting the towing coupler lock within the set of hitch receiver openings while the hitch receiver is evacuated in order to prevent insertion of a towing apparatus in the hitch receiver.

In some embodiments, the method further comprises the step of altering a relative length of the removable towing coupler. In various embodiments, altering the relative length comprises selecting a pair of towing coupler openings from the set of towing coupler openings. In various embodiments, the pair of towing coupler openings are defined at a desired length along a length of the removable towing coupler. In various embodiments, altering the relative length comprises aligning the pair of towing coupler openings with the set of hitch receiver openings. In various embodiments, altering the relative length comprises inserting the towing coupler lock within the pair of towing coupler openings and the set of hitch receiver openings when the pair of towing coupler openings and the set of hitch receiver openings are aligned.

In some embodiments, the method further comprises the step of dis-engaging a first selectively dis-engageable coupling mechanism from the removable towing coupler and engaging a second selectively dis-engageable coupling mechanism with the removable towing coupler.

In some embodiments, the first dis-engageable coupling mechanism and the second dis-engageable coupling mechanism are chosen from the group consisting of a ball hitch, a pintle hitch, a weight distribution hitch, a gooseneck hitch, and a 5$^{th}$ wheel hitch.

In some embodiments, the method further comprises the step of engaging a couplable jack engaging portion of a couplable jack with a couplable jack receiving portion of the removable towing coupler thereby removably coupling the couplable jack to the removable towing coupler.

In some embodiments, the method further comprises the step of selectively rotating the couplable jack in a range of at least 180°.

In some embodiments, the method further comprises the step of selectively anchoring the couplable jack in at least one selective anchoring orientation of 0°, 90°, or 180°, relative to the removable towing coupler. In various embodiments, selectively anchoring comprises aligning a set of couplable jack receiving portion openings with a set of couplable jack engaging portion openings. In various embodiments, selectively anchoring comprises inserting a couplable jack lock within the couplable jack receiving portion openings and the couplable jack engaging portion openings when the couplable jack receiving portion openings and the couplable jack engaging portion openings are aligned.

In accordance with another aspect, a removable towing coupler is provided. The removable towing coupler of various embodiments defines a hitch receiver end, an opposing proximal end, and a couplable jack receiving portion. The hitch receiver end of various embodiments is configured to be removably nested within a hitch receiver of a towed vehicle. The hitch receiver end of various embodiments defines a set of towing coupler openings. The set of towing coupler openings of various embodiments align with a set of hitch receiver openings when the hitch receiver end is nested within the hitch receiver of the towed vehicle. The set of towing coupler openings receive a towing coupler lock therethrough when aligned with the set of hitch receiver openings. The couplable jack receiving portion of various embodiments receives a couplable jack, and is oriented intermediate to the hitch receiver end and the proximal end, and extends outwardly from a lateral aspect of the removable towing coupler. The removable towing coupler of various embodiments comprises a couplable jack. The couplable jack of various embodiments is received by the couplable jack receiving portion in a way that permits selective rotation of the couplable jack.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates a view of a jack lock inserted within aligned couplable jack receiving portion openings and couplable jack engaging portion openings not otherwise shown in other views.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. The term "or" (also denoted "I") is used herein in both the alternative and conjunctive senses, unless otherwise indicated. The terms "illustrative" and "exemplary" are used to be examples with no indication of quality level. Like numbers refer to like elements throughout.

I. EXEMPLARY EMBODIMENTS OF THE TOWING ATTACHMENT ASSEMBLY

Figure 2:
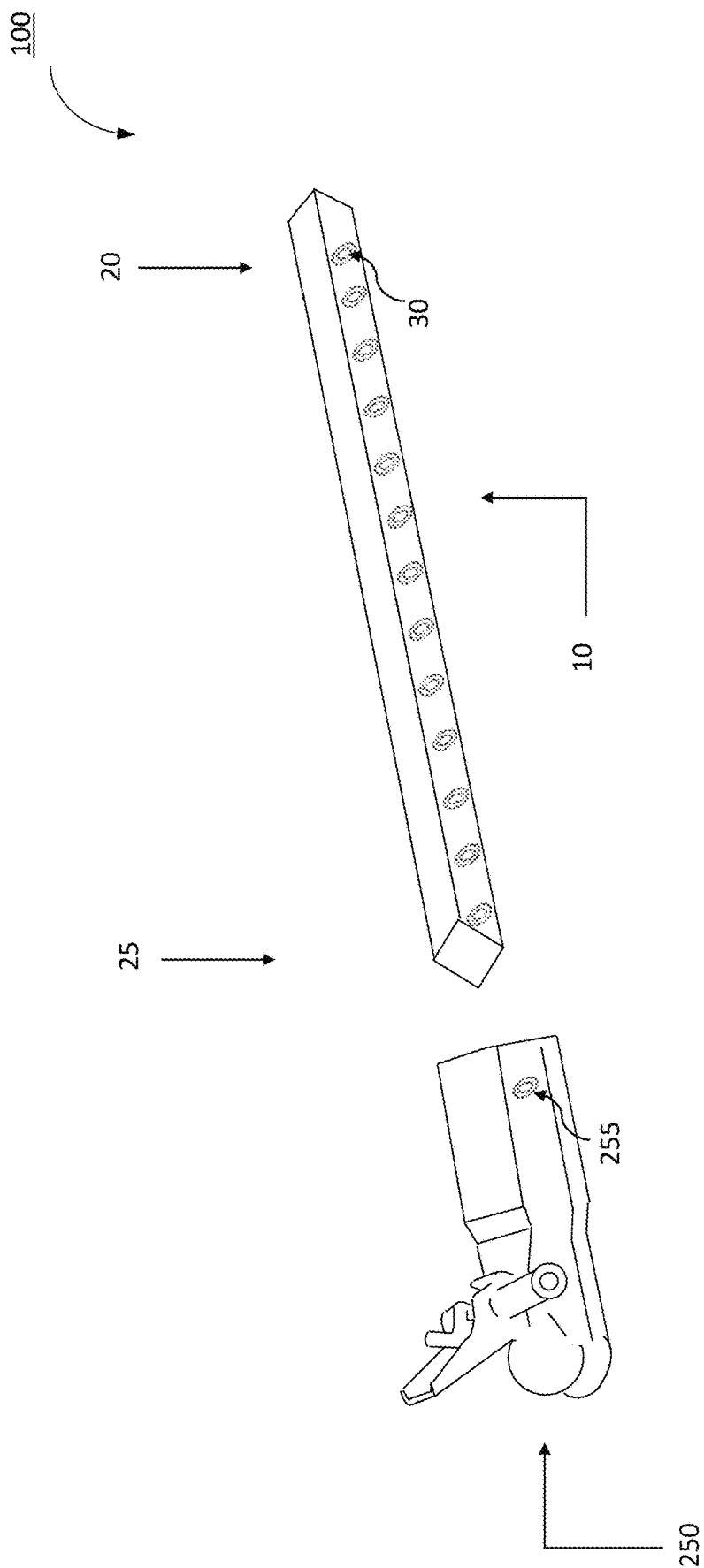
FIG. 2 illustrates an exploded view of a towing attachment assembly according to various embodiments.

FIG. 2 illustrates an exploded view of a towing attachment assembly 100 according to various embodiments. In the depicted embodiment, the towing attachment assembly 100 comprises a removable towing coupler 10, and a selectively dis-engageable coupling mechanism 250. The removable towing coupler 10 defines a hitch receiver end 20 and a hitch coupling end 25. In some alternate embodiments, the removable towing coupler 10 may comprise an opposing proximal end and a hitch receiver end 20. The hitch coupling end 25 comprises a selectively dis-engageable coupling mechanism 250. The selectively dis-engageable coupling mechanism 250 defines a set of coupling mechanism engaging openings 255 (described below with reference to FIG. 3).

Figure 8:
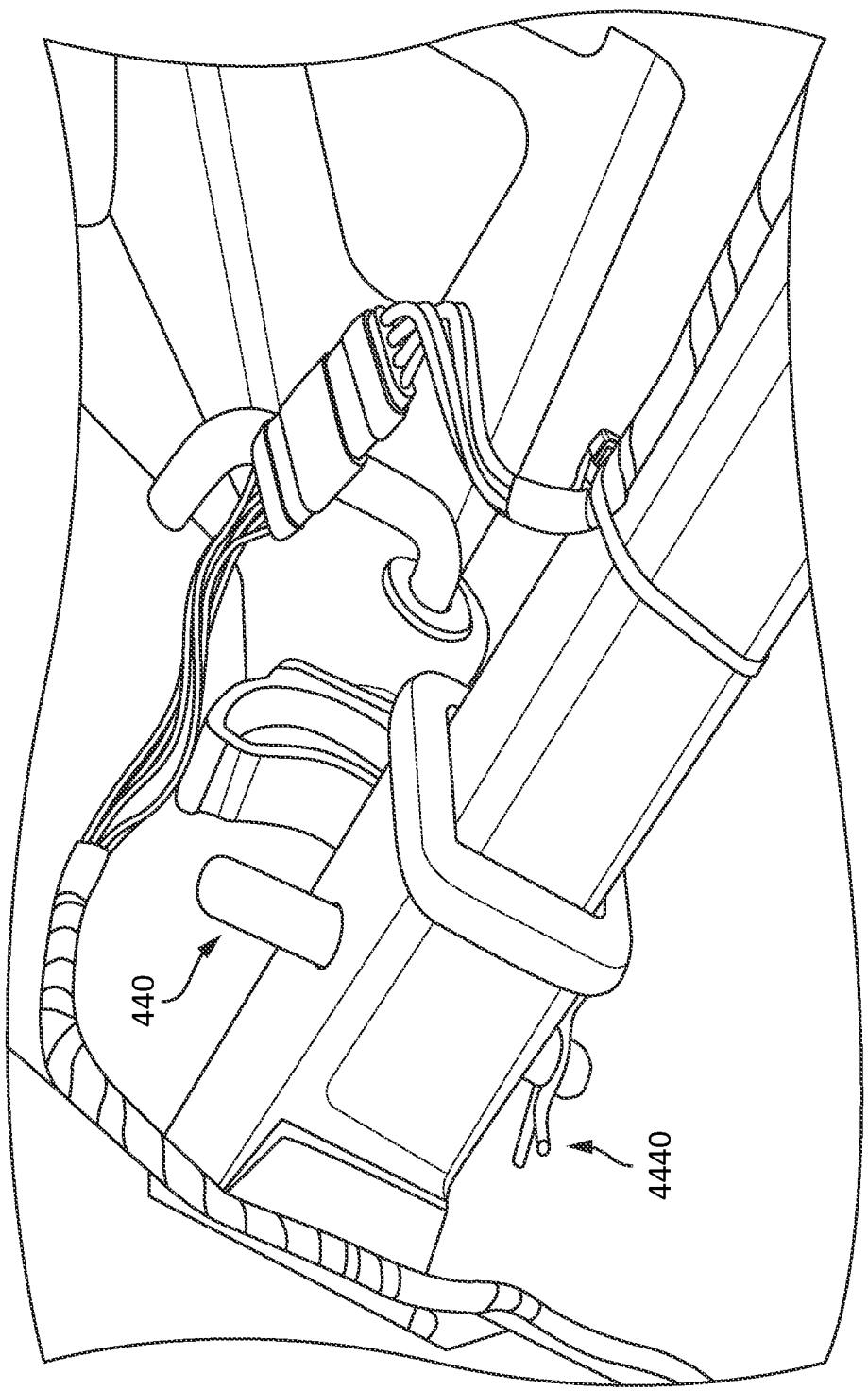
FIG. 8 illustrates a towing coupler lock inserted within aligned towing coupler openings and hitch receiver openings according to various embodiments.

The hitch receiver end 20 is configured to be removably nested within the hitch receiver of a towed vehicle. For example, the hitch receiver end 20 may define a geometric profile that is smaller than a geometric profile of the hitch receiver of the towed vehicle. The hitch receiver end 20 defines a set of towing coupler openings 30. The towing coupler openings 30 may be through holes, slots, or any otherwise-shaped opening such that a towing coupler lock 40 (discussed below in reference to FIG. 3) may be inserted within the aligned towing coupler openings 30 and the hitch receiver openings. The set of towing coupler openings 30 are configured to align with a set of hitch receiver openings when the hitch receiver end 20 is nested within the hitch receiver of the towed vehicle. The set of hitch receiver openings are defined by the hitch receiver in order to facilitate insertion of a towing coupler in the hitch receiver. In some embodiments, the towing coupler openings 30 may extend along at least a majority of the length of the removable towing coupler 10. In these example embodiments, a user may also alter a relative length of the removable towing coupler. The towing coupler lock 40 is configured at least to be inserted within the aligned towing coupler openings 30 and the hitch receiver openings to secure the hitch receiver end 20 within the hitch receiver. In various embodiments, the towing coupler lock 40 comprises a hitch pin 440 that is inserted within the hitch receiver openings. In some embodiments, the towing coupler lock 40 further comprises a locking portion 4440 (discussed below with reference to FIG. 8) that secures the towing coupler lock 40 such that an inserted removable towing coupler 10 cannot removed from the hitch receiver without removing the locking portion 4440 in order to remove the towing coupler lock 40. A locking portion 4440 may be, without limitation, a keyed lock, a combination locks, a locking clip or the like. In embodiments further comprising a locking portion 4440, the locking portion 4440 may engage a groove defined on the hitch pin 440. When the locking portion 4440 is thus engaging the hitch pin 440, towing coupler lock 40 cannot be removed from the hitch receiver openings without first disengaging the locking portion 4440. This is, of course, because the hitch pin 440 cannot be removed from the hitch receiver openings and the towing coupler openings. This is also shown in greater detail in FIG. 8. In some embodiments, the towing coupler lock 40 is further configured to be inserted within the hitch receiver openings of an evacuated hitch receiver to prevent insertion of a towing apparatus within the evacuated hitch receiver. In this way, one is also prevented from inserting a removable towing coupler 10 in an evacuated hitch receiver to attempt theft of a parked vehicle.

Figure 3:
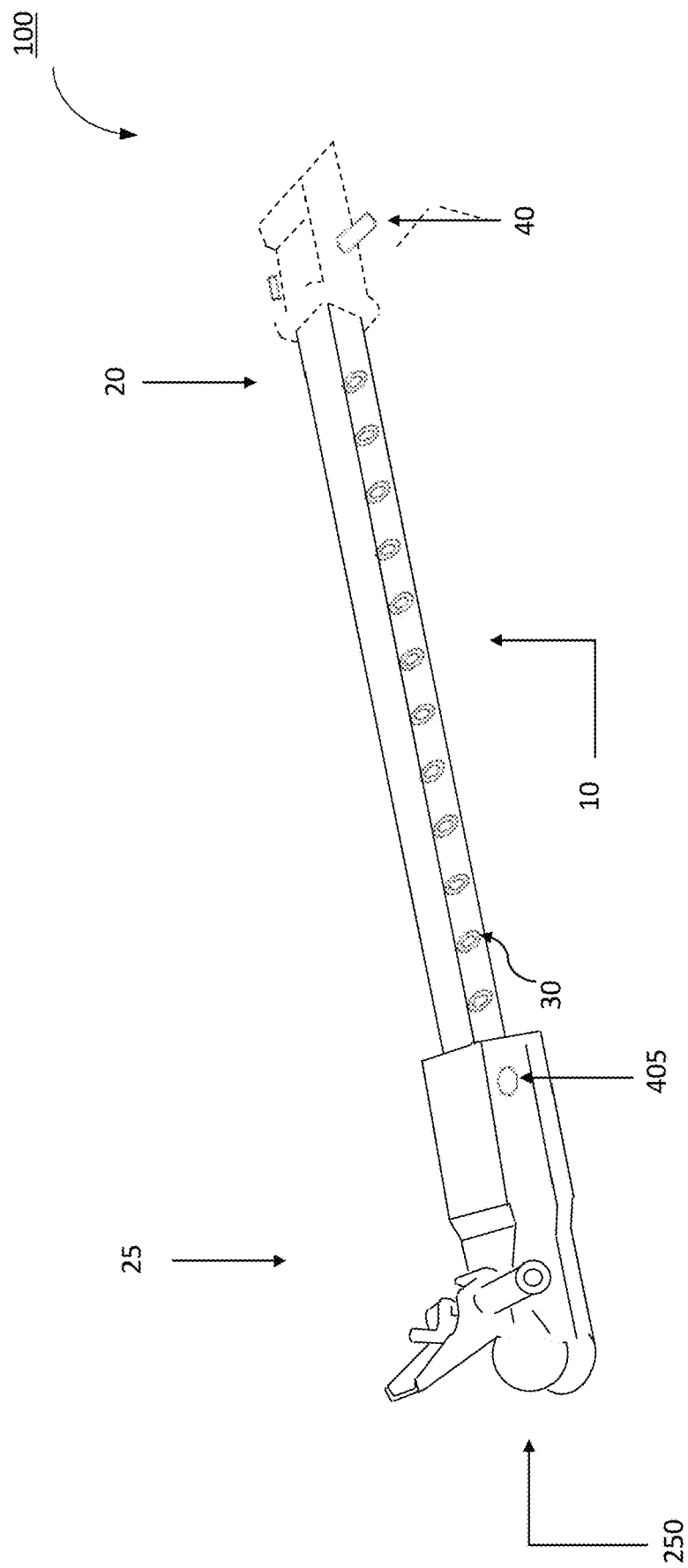
FIG. 3 illustrates a left-perspective view of a towing attachment assembly according to various embodiments.

FIG. 3 illustrates a left-perspective view of a towing attachment assembly 100. As shown, the hitch receiver end 20 is removably nested within the hitch receiver of a towed vehicle (depicted in broken lines). In the depicted embodiment, the towing coupler openings 30 extend along a length of the removable towing coupler 10, thereby allowing a user to selectively configure the length of the removable towing coupler 10. A towing coupler lock 40 is shown inserted within the aligned towing coupler openings 30 and the hitch receiver openings. In use, selectively configuring the length of the removable towing coupler 10 may comprise aligning a pair of towing coupler openings 30 defined at a desired length of the removable towing coupler 10 with the set of hitch receiver openings and inserting the towing coupler lock 40 within the aligned towing coupler openings 30 and the hitch receiver openings. The towing coupler lock 40 may be any suitable fastening means configured to secure the hitch receiver end 20 within the hitch receiver of a towed vehicle including, but not limited to, a nut and bolt, a toggle bolt, a rivet, a J-bolt, a shoulder bolt, a socket screw, a pin and clip, and the like.

Figure 1:
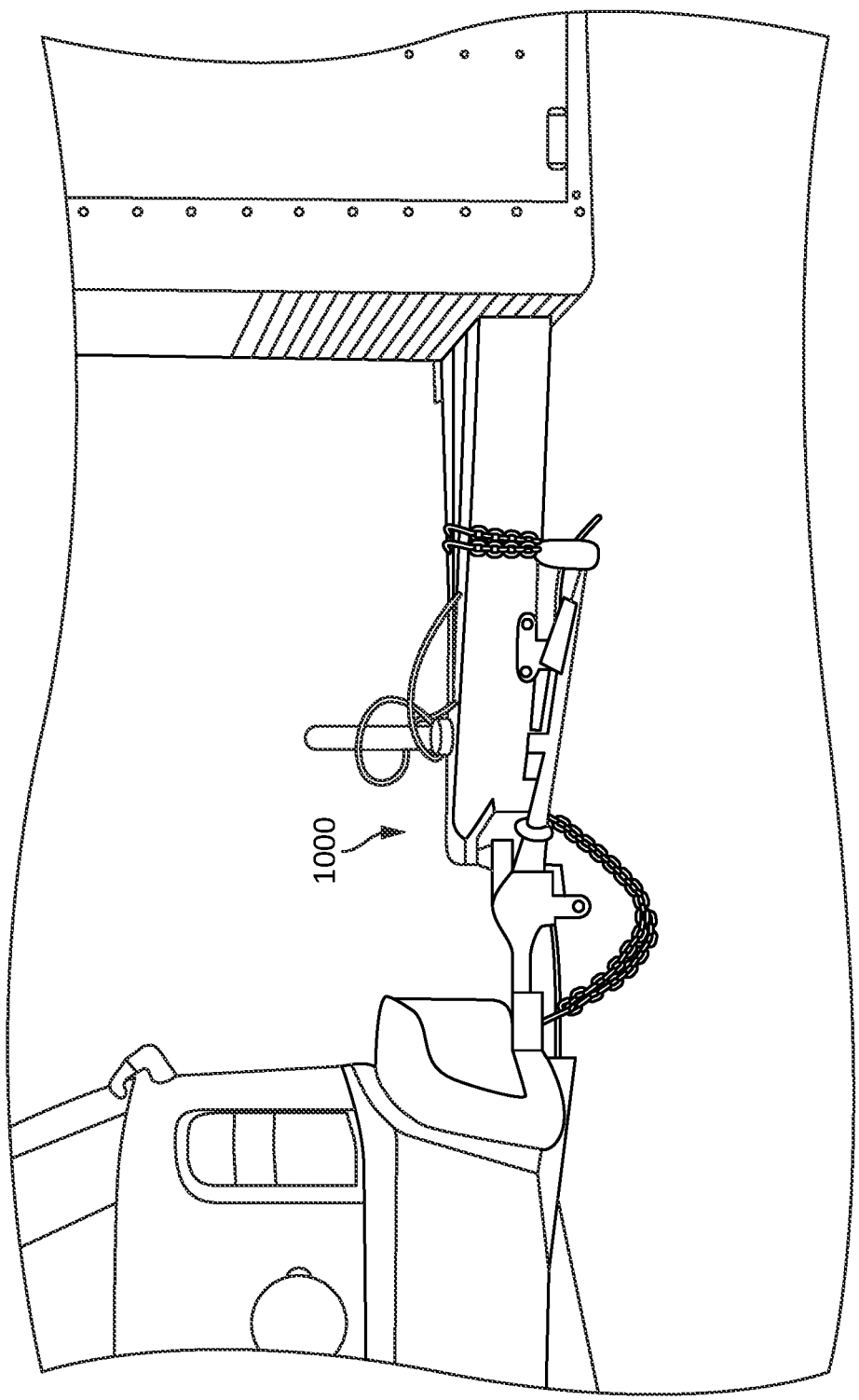
FIG. 1 illustrates a conventional towing assembly.

The hitch coupling end 25 comprises a selectively dis-engageable coupling mechanism 250. The selectively dis-engageable coupling mechanism 250 is configured to be selectively dis-engaged from the removable towing coupler 10 and to be removably coupled with a trailer hitch of a towing vehicle. In the depicted embodiment, the selectively dis-engageable coupling mechanism 250 defines a set of coupling mechanism engaging openings 255 (shown in FIG. 1) configured to align with the set of towing coupler openings 30 and receive a coupling mechanism lock 405 within the aligned coupling mechanism engaging openings 255 and towing coupler openings to support selective dis-engaging. The coupling mechanism lock 405 may be any suitable fastening means configured to secure and selectively engage the selectively dis-engageable coupling mechanism 2500 to the removable towing coupler 10 including, but not limited to, a nut and bolt, a toggle bolt, a rivet, a J-bolt, a shoulder bolt, a socket screw, a pin and clip, and the like. The depicted selectively dis-engageable coupling mechanism 250 comprises a ball hitch. However, in various embodiments, the selectively dis-engageable coupling mechanism may be any suitable coupling mechanism including, but not limited to, a pintle hitch, a weight distribution hitch, a gooseneck hitch, and a $5^{th}$ wheel hitch.

In some embodiments, removable towing coupler 10 includes a couplable jack receiving portion 15. Coupler jack receiving portion 15 is attached to removable towing coupler 10 through welding or other attachment means including but not limited to brazing, soldering, riveting, metal stitching and the like.

Figure 4:
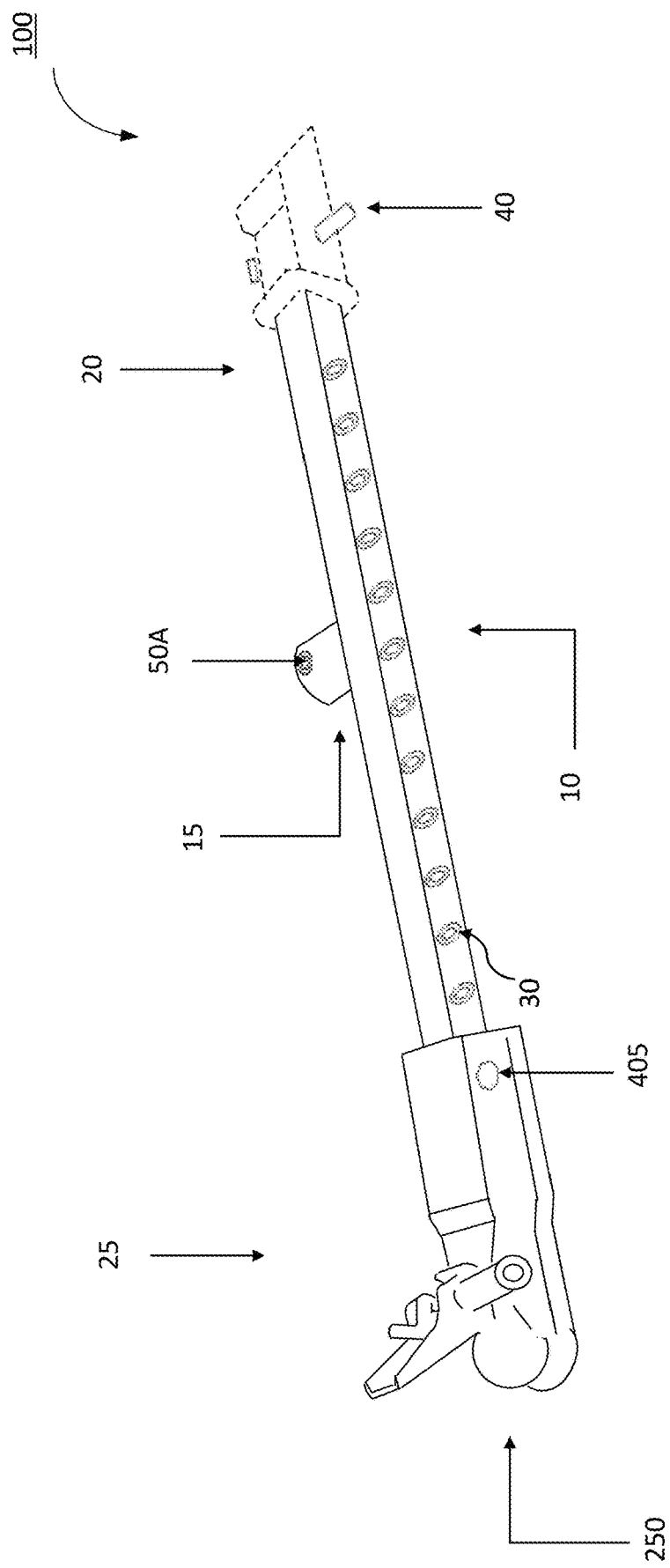
FIG. 4 illustrates a left-perspective view of a towing attachment assembly comprising a couplable jack receiving portion according to various embodiments.
Figure 9:
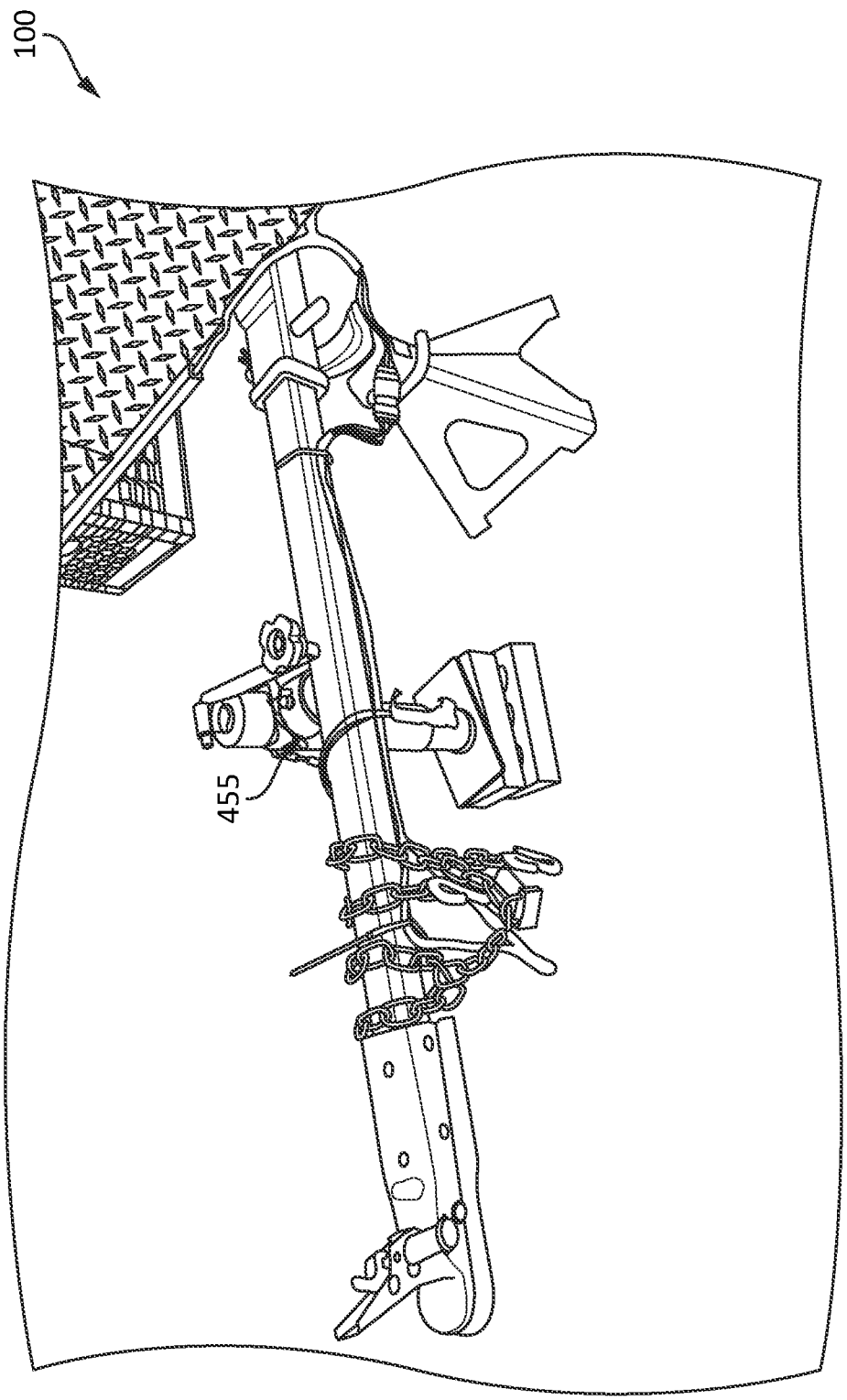
FIG. 9 illustrates a left-perspective view of a towing attachment assembly comprising a couplable jack receiving portion and a couplable jack according to various embodiments.

FIG. 4 illustrates a left-perspective view of a towing attachment assembly 100 comprising a couplable jack receiving portion 15 according to various embodiments. The depicted couplable jack receiving portion 15 is oriented intermediate to the hitch receiver end 20 and the hitch coupling end 25 and extends outwardly from a lateral aspect of the removable towing coupler 10. The couplable jack receiving portion 15 is configured to receive a couplable jack. For example, the depicted couplable jack receiving portion 15 defines a geometric profile that is smaller than a geometric profile of a couplable jack engaging portion 455 of the couplable jack 450 (shown and described below with reference to FIGS. 5A-5B). Specifically, the depicted couplable jack receiving portion 15 defines a substantially circular geometric profile, having a couplable jack receiving portion diameter. The couplable jack engaging portion 455 defines a substantially circular opening, the diameter of the substantially circular opening being larger than the couplable jack receiving portion diameter. Thus, the couplable jack receiving portion 15 is configured to be removably nested within the couplable jack engaging portion 455. FIG. 9 illustrates a left-perspective view of a towing attachment assembly comprising a couplable jack receiving portion and a couplable jack according to various embodiments. Thus, FIG. 9 further illustrates an embodiment of the towing attachment assembly 100 wherein the couplable jack receiving portion 15 is removably nested within the couplable jack engaging portion 455.

The depicted couplable jack receiving portion 15 defines a set of couplable jack receiving portion openings that are configured at least to receive a couplable jack lock 45 therethrough to selectively anchor the couplable jack 450 to the removable towing coupler 10 when the couplable jack receiving portion 15 is removably nested within the couplable jack engaging portion 455. The couplable jack receiving portion openings of various embodiments may be defined at various advantageous orientations relative to the couplable jack receiving portion 15, in order to support selective anchoring of the couplable jack 450 in certain preferred orientations with respect to the removable towing coupler 10. In an exemplary embodiment, the set of couplable jack receiving portion openings may comprise at least two couplable jack receiving portion openings. The depicted set of couplable jack receiving portion openings comprises a first couplable jack receiving portion opening 50A and a second couplable jack receiving portion opening 50B (not shown) defined about a circumference of the couplable jack receiving portion 15. The depicted first couplable jack receiving portion opening 50A is defined near to a cranial aspect of the couplable jack receiving portion 15. The second couplable jack receiving portion opening 50B is defined near to a caudal aspect of the couplable jack receiving portion 15. In some embodiments, selectively anchoring the couplable jack 450 may comprise aligning the set of couplable jack receiving portion openings with the set of couplable jack engaging portion openings (shown and described below in reference to FIGS. 5A and 5B) and inserting the couplable jack lock 45 within the aligned couplable jack receiving portion openings and the couplable jack engaging portion openings. Thus, the first couplable jack receiving portion opening 50A and the second couplable jack receiving portion opening 50B are configured to align with the set of couplable jack engaging portion openings and to receive the couplable jack lock 45 therethrough when aligned with the set of couplable jack engaging portion openings.

Figure 5B:
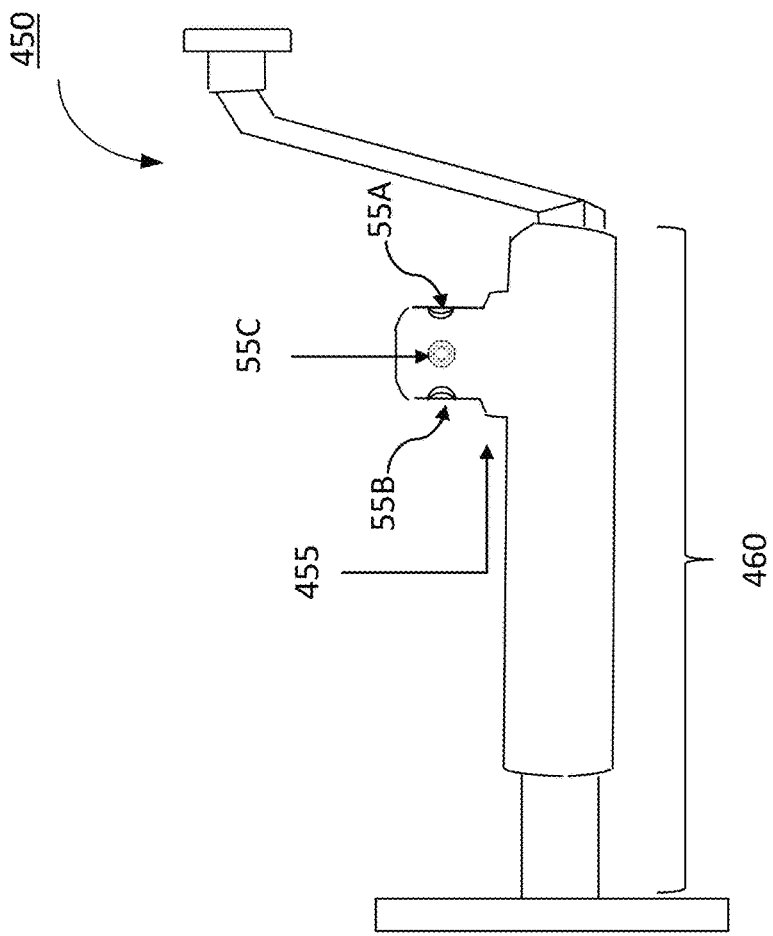
FIGS. 5A-5B illustrate preferred selective anchoring orientations of a couplable jack relative to a removable towing coupler according to various embodiments.
Figure 5A:
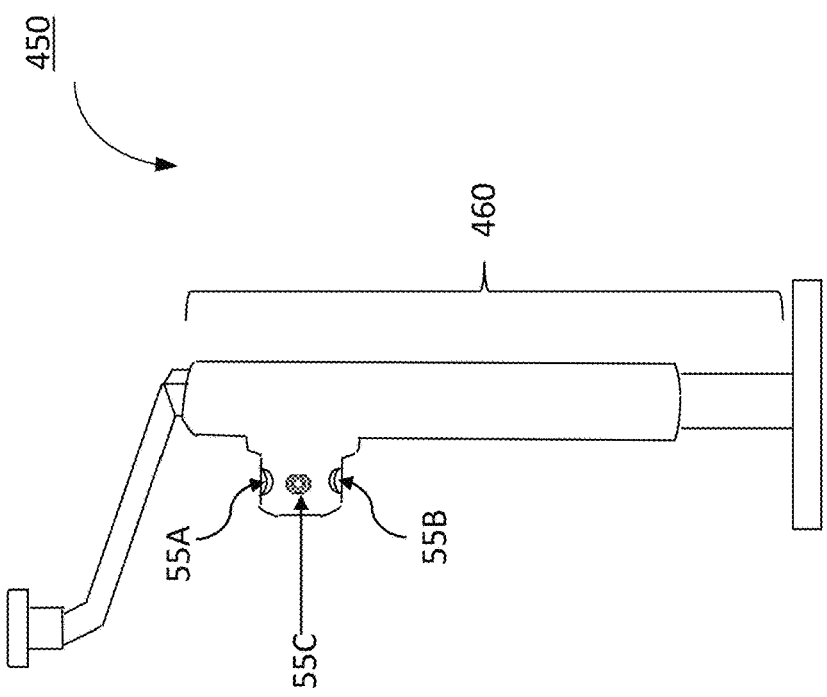

FIGS. 5A and 5B illustrate preferred selective anchoring orientations of a couplable jack 450 relative to a removable towing coupler 10 (not shown) according to various embodiments. The couplable jack 450 of various embodiments is configured to be selectively rotatable when the couplable jack 450 is coupled to the removable towing coupler. In some embodiments, the couplable jack 450 is selectively rotatable in a range of at least 180°. Thus, the couplable jack 450 of certain embodiments is further configured to be selectively anchored in at least one orientation of a plurality of selective anchoring orientations to which the couplable jack 450 may be selectively rotated.

In some embodiments, the couplable jack 450 may be configured so that a main body 460 of the couplable jack 450 is rotatable about a lateral axis of rotation shared by the couplable jack receiving portion 15 and the couplable jack mounting portion 455. In certain embodiments, the lateral axis of rotation is a cylindrical axis shared by the couplable jack receiving portion 15 and the couplable jack mounting portion 455 when the couplable jack receiving portion 15 is removably nested within the couplable jack mounting portion 455. Thus, configured to be selectively rotatable relative to the removable towing coupler 10, the couplable jack 450 may further be selectively anchored in a plurality of preferred selective anchoring orientations.

Figure 10:
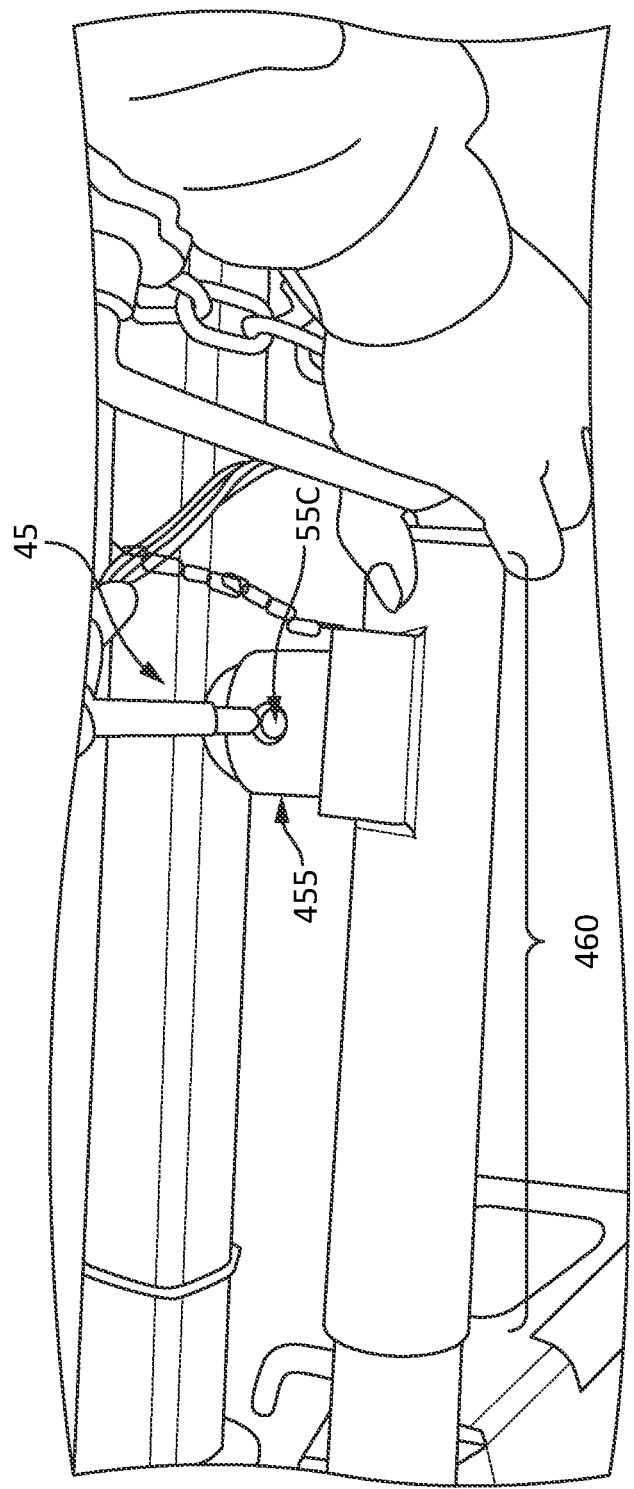
FIG. 10 illustrates a method of using a towing attachment assembly including selectively anchoring a couplable jack in a selective anchoring orientation of 180°.

The couplable jack 450 of an exemplary embodiment may be selectively anchored in at least three selective anchoring orientations. FIG. 5A depicts a couplable jack 450 in a first selective anchoring orientation of 90° relative to the removable towing coupler 10. That is, the depicted couplable jack 450 is selectively anchored such that a main body 460 of the couplable jack 450, from which the couplable jack engaging portion 455 extends, is oriented perpendicularly to or along a sagittal plane as compared to the removable towing coupler 10 when the couplable jack receiving portion 15 is removably nested within the couplable jack engaging portion 455. In contrast, FIG. 5B depicts a couplable jack 450 in a second selective anchoring orientation of 180° relative to the removable towing coupler 10. Thus, the couplable jack 450 depicted in FIG. 5B is selectively anchored such that a main body 460 of the couplable jack 450, from which the couplable jack engaging portion 455 extends, is oriented parallel to or along a coronal plane as compared to the removable towing coupler 10 when the couplable jack receiving portion 15 is removably nested within the couplable jack engaging portion 455. This selective anchoring orientation can also be seen in FIG. 10.

It will be understood from the teachings of the present disclosure that the third selective anchoring orientation of 0° (not shown) is complementary to the second selective anchoring orientation of 180°. Either of the first or second selective anchoring orientations orients the main body 460 of the couplable jack 450 along a coronal plane as compared to the removable towing coupler 10. The depicted second selective anchoring orientation of FIG. 5B may be defined as a parallel orientation such that the third selective anchoring orientation is consequently defined as an anti-parallel orientation. Though, this is not necessary. In various embodiments, these complementary selective anchoring orientations may be regarded as interchangeable. Therefore, the second selective anchoring orientation may be regarded as an orientation of 0° relative to the removable towing coupler 10 (i.e., parallel), with the third selective anchoring orientation being regarded as 180° (i.e., anti-parallel) relative thereto.

The depicted couplable jack engaging portion 455 defines a set of couplable jack engaging portion openings that are configured at least to receive a couplable jack lock 45 therethrough to selectively anchor the couplable jack 450 to the removable towing coupler 10 when the couplable jack receiving portion 15 is removably nested within the couplable jack engaging portion 455. The couplable jack engaging portion openings of various embodiments may be defined at various advantageous orientations relative to the couplable jack engaging portion 455, in order to support selective anchoring of the couplable jack 450 in certain preferred selective anchoring orientations with respect to the removable towing coupler 10. In an exemplary embodiment, the set of couplable jack engaging portion openings may comprise at least four couplable jack receiving portion openings. The depicted set of couplable jack receiving portion openings comprises a first couplable jack engaging portion opening 55A, a second couplable jack engaging portion opening 55B, a third couplable jack engaging portion opening 55C, and a fourth couplable jack engaging portion opening 55D (not shown). The depicted couplable jack engaging portion openings are defined about a circumference of the couplable jack engaging portion 455, each being advantageously spaced at 90° apart from its nearest neighbor. Thus, the depicted first couplable jack engaging portion opening 55A is defined near to a cranial aspect of the couplable jack engaging portion 455. The second couplable jack engaging portion opening 55B is defined near to a caudal aspect of the couplable jack engaging portion 455. The third couplable jack engaging portion opening 55C and the fourth couplable jack engaging portion opening 55D are defined on opposing lateral aspects of the couplable jack engaging portion 455. The set of couplable jack engaging portion openings of various embodiments may be configured at other suitable orientations, including but not limited to, at equidistant spacings of 30°, 45°, or 60° from one another.

The set of couplable jack engaging portion openings of various embodiments may be configured to align with the set of couplable jack receiving portion openings to support selective anchoring of the couplable jack 450. In some embodiments, the couplable jack engaging portion openings may be defined thereon the couplable jack engaging portion 455 in conjugate pairs (i.e., oriented at opposing ends of a coordinate axis). Thus, in certain embodiments, only one conjugate pair of couplable jack engaging portion openings may be aligned with the set of couplable jack receiving portion openings at a time. When a conjugate pair of couplable jack engaging portion openings is aligned with the set of couplable jack receiving portion yids, the couplable jack lock 45 is configured to be inserted within the aligned conjugate pair of couplable jack engaging portion openings and the couplable jack receiving portion openings. In the 90° selective anchoring orientation depicted in the embodiment of FIG. 5A, the first couplable jack engaging portion opening 55A and the second couplable jack engaging portion opening 55B define a conjugate pair. Thus, when the couplable jack receiving portion 15 is removably nested within the couplable jack engaging portion, the first couplable jack engaging portion opening 55A and the second couplable jack engaging portion opening 55B align with the set of couplable jack receiving portion openings to receive the couplable jack lock 45 therein. In contrast, in the embodiment depicted in FIG. 5B, the conjugate pair defined by the third couplable jack engaging portion opening 55C and the fourth couplable jack engaging portion opening 55D is configured to align with the set of couplable jack receiving openings and receive the couplable jack lock therein.

FIG. 6 illustrates a view of a jack lock 45 (shown in partial broken lines) inserted within aligned couplable jack receiving portion openings (not shown) and couplable jack engaging portion openings (not shown) not otherwise visible in other Figures. The couplable jack lock 45 may be any suitable fastening means configured to secure and selectively anchor the couplable jack 450 to the removable towing coupler 10 including, but not limited to, a nut and bolt, a toggle bolt, a rivet, a J-bolt, a shoulder bolt, a socket screw, a pin and clip, and the like. In an exemplary embodiment, the couplable jack lock 45 is further configured to be selectively lockable. For example, the towing attachment assembly may further comprise a couplable jack key that is configured to selectively unlock and lock the couplable jack lock 45 so that it is or is not removable. Thus, the couplable jack key may provide an additional security mechanism.

Figure 7:
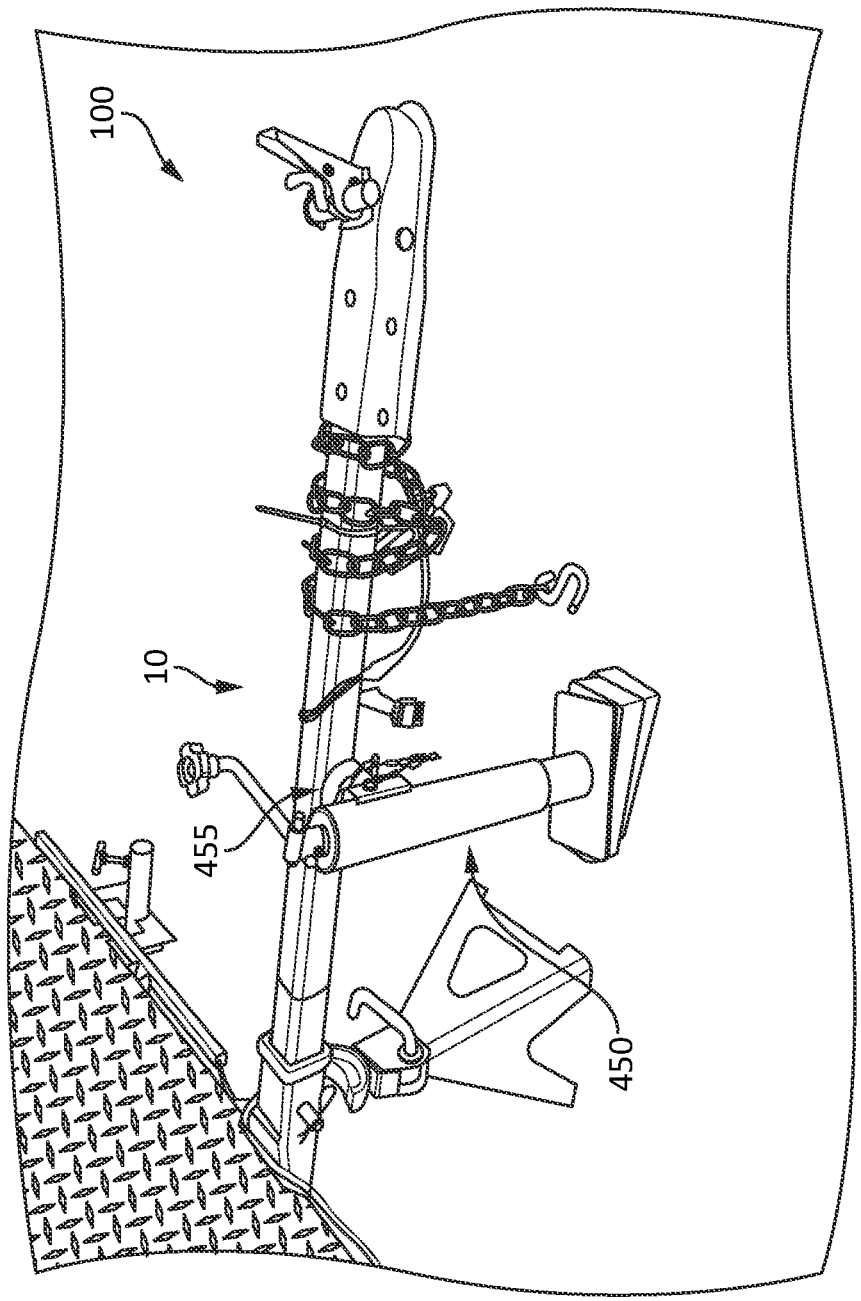
FIG. 7 illustrates a right-perspective view of removable tow attachment assembly comprising a couplable jack according to various embodiments.

In the embodiment depicted in FIG. 6, the couplable jack 450 is selectively anchored in a selective anchoring orientation of 90° relative to the removable towing coupler 10. This particular selective anchoring orientation can also be seen in FIG. 7. The couplable jack receiving portion 15 (shown in broken lines) is removably nested within the couplable jack engaging portion. As described above, with reference to FIG. 5A, the first couplable jack engaging portion opening and the second couplable jack engaging portion opening of the embodiment shown in FIG. 6 define a conjugate pair that is aligned with the set of couplable jack receiving portion openings. Thus, the couplable jack lock 45 is received within the aligned couplable jack engaging portion openings and the couplable jack receiving portion openings to selectively anchor the couplable jack 450 in a selective anchoring orientation of 90°.

II. EXEMPLARY METHODS OF USING THE TOWING ATTACHMENT ASSEMBLY

The towing attachment assembly 100 of any of the previously described embodiments may be used in myriad situations and environments where it is advantageous to have configurability and portability of a towing attachment assembly. For example, environments including, but not limited to, personal homes, towing yards, junk yards, camping sites, and the like will find the towing attachment assembly of the present disclosure advantageous.

In at least one method of use, a user may initiate towing of a vehicle by inserting a hitch receiver end of a removable towing coupler into a hitch receiver of a towed vehicle so that the hitch receiver end is removably nested within the hitch receiver of the towed vehicle. This may be done so that a set of towing coupler openings defined by the removable towing coupler align with a set of hitch receiver openings defined by the hitch receiver. A user may then insert a towing coupler lock within the aligned towing coupler openings and the hitch receiver openings in order to secure the hitch receiver end within the hitch receiver. The towing attachment assembly is configured to allow for articulation and yet support when the hitch receiver end is thus removably nested and secured within the hitch receiver of the towed vehicle. A user may then removably couple a first selectively dis-engageable coupling mechanism of a hitch coupling end of the removable towing coupler with a trailer hitch of a towing vehicle.

In certain cases, a user may require configurability of the towing attachment assembly 100. For example, a user may determine that he is not able to tow a vehicle because the turning radius of the trailer hitch coupled to the towing vehicle is too small. Thus, in some methods of use he may selectively configure the length of the removable towing coupler 10 to make it advantageously longer, thereby increasing the turning radius. Alternatively, he may shorten the removable towing coupler 10 for applications that have stricter overall length requirements. In at least these methods of use, a user may alter a relative length of the removable towing coupler 10. This may comprise aligning a pair of towing coupler openings 30 defined at a desired length of the removable towing coupler 10 with the set of hitch receiver openings and inserting the towing coupler lock 40 within the aligned towing coupler openings 30 and the hitch receiver openings. As another example, a user may need to tow more than one vehicle in a given situation. If the vehicles to be towed have different towing coupler configurations, then a conventional trailer hitch will be of little or no use. However, the towing attachment assembly 100 of the present disclosure will allow the user configurability to tow each car as needed. A user may dis-engage a first selectively dis-engageable coupling mechanism 250 from the removable towing coupler 10 and engage a second selectively dis-engageable coupling mechanism 250 with the removable towing coupler 10.

Moreover, the configurability of the towing attachment assembly 100 further facilitates efficient towing as various embodiments comprise a couplable jack 450. The couplable jack 450 may be any mechanical lifting device—hydraulic, pneumatic, or otherwise—adapted for use with the towing attachment assembly 100 or specially designed for such use to be selectively anchorable. A user may removably couple the couplable jack 450 to the removable towing coupler 10, and selectively anchor the couplable jack 450 in 90° selective anchoring orientation to facilitate raising and lowering of a vehicle (shown if FIGS. 5A, 6, 7, and 9). A user may then selectively anchor the couplable jack 450 in either a 0° or 180° selective anchoring orientation to facilitate transporting the towing attachment assembly and reduce its spatial footprint (shown in FIGS. 5B and 10).

To ensure the safety and security of the towing attachment assembly 100 after a towed vehicle is parked and the towing attachment assembly 100 is removed, a user may insert the towing coupler lock 40 within the hitch receiver openings of an evacuated hitch receiver to prevent the insertion of a towing coupler in the evacuated hitch receiver. In this way, the towing attachment assembly 100 allows for complete lockout of the towed vehicle hitch receiver. Therefore, there can be no unwanted coupling of a hitch trailer and the towing attachment assembly 100 provides greater security and eases the user's fears of theft.

III. CONCLUSION

It is emphasized that the embodiments described above are merely examples of the disclosed apparatus and methods. Many variations and modifications are understood to be able to be made to the embodiments described above, and those variations and modifications are to be included within the scope of this disclosure and invention.

That which is claimed:

1. A towing attachment assembly comprising:
a removable towing coupler, the removable towing coupler defining a hitch receiver end and a hitch coupling end, wherein the hitch receiver end is configured to be removably nested within a hitch receiver of a towed vehicle, and defines a set of towing coupler openings, the set of towing coupler openings aligning with a set of hitch receiver openings when the hitch receiver end is nested within the hitch receiver of the towed vehicle, and receiving a towing coupler lock therethrough when aligned with the set of hitch receiver openings, and wherein the hitch coupling end comprises a selectively dis-engageable coupling mechanism configured to be selectively dis-engaged from the removable towing coupler and to be coupled with a trailer hitch of a towing vehicle; and
a towing coupler lock that secures the hitch receiver end within the hitch receiver, wherein the towing coupler lock comprises a hitch pin that is inserted within the set of towing coupler openings and the set of hitch receiver openings when the set of towing coupler openings and the set of hitch receiver openings are aligned, a locking portion that engages the hitch pin such that the hitch pin cannot be removed from the set of towing coupler openings and the set of hitch receiver openings without first disengaging the locking portion, and the set of towing coupler openings extends along at least a majority of a length of the removable towing coupler, thereby allowing a user to alter a relative length of the removable towing coupler.

2. The towing attachment assembly of claim 1, wherein the locking portion is a locking clip that engages a groove defined on the hitch pin such that the hitch pin cannot be removed from the set of hitch receiver openings and the set of towing coupler openings without first disengaging the locking portion.

3. The towing attachment assembly of claim 1, wherein the towing coupler lock is inserted within the set of hitch receiver openings while the hitch receiver is evacuated in order to prevent insertion of a towing apparatus within the hitch receiver.

4. The towing attachment assembly of claim 1, wherein the selectively dis-engageable coupling mechanism is a ball hitch.

5. The towing attachment assembly of claim 1, further comprising a couplable jack receiving portion, wherein the couplable jack receiving portion receives a couplable jack and is oriented intermediate to the hitch receiver end and the hitch coupling end and extends outwardly from a lateral aspect of the removable towing coupler.

6. The towing attachment assembly of claim 5, further comprising a couplable jack that is removably coupled to the removable towing coupler.

7. The towing attachment assembly of claim 6, further comprising a couplable jack lock that secures the couplable jack to the removable towing coupler.

8. The towing attachment assembly of claim 6, wherein the couplable jack is selectively rotatable when the couplable jack is coupled to the removable towing coupler.

9. The towing attachment assembly of claim 8, wherein the couplable jack is selectively rotatable in a range of at least 180° relative to the removable towing coupler.

10. The towing attachment assembly of claim 9, wherein the couplable jack is selectively anchorable in at least one orientation of 0°, 90°, or 180° relative to the removable towing coupler.

11. A method of using a towing attachment assembly, the method comprising the steps of:
aligning a hitch receiver end of a removable towing coupler with a hitch receiver of a towed vehicle such that the removable towing coupler may be nested within the hitch receiver;
inserting the hitch receiver end of the removable towing coupler into the hitch receiver of the towed vehicle so that the hitch receiver end is removably nested within the hitch receiver of the towed vehicle, and so that a set of towing coupler openings defined by the removable towing coupler are aligned with a set of hitch receiver openings defined by the hitch receiver;
inserting a towing coupler lock within the set of towing coupler openings and the set of hitch receiver openings, when the set of towing coupler openings and the set of hitch receiver openings are aligned, in order to secure the hitch receiver end within the hitch receiver; and
dis-engaging a selectively dis-engageable coupling mechanism from the removable towing coupler and engaging the selectively dis-engageable coupling mechanism with the removable towing coupler.

12. The method of claim 11, further comprising the step of inserting the towing coupler lock within the set of hitch receiver openings while the hitch receiver is evacuated in order to prevent insertion of a towing apparatus in the hitch receiver.

13. The method of claim 11, further comprising the step of altering a relative length of the removable towing coupler, wherein altering the relative length comprises:
selecting a pair of towing coupler openings from the set of towing coupler openings, the pair of towing coupler openings being defined at a desired length along a length of the removable towing coupler;
aligning the pair of towing coupler openings with the set of hitch receiver openings;
and inserting the towing coupler lock within the pair of towing coupler openings and the set of hitch receiver openings when the pair of towing coupler openings and the set of hitch receiver openings are aligned.

14. The method of claim 11, wherein the dis-engageable coupling mechanism is a ball hitch.

15. The method of claim 11, further comprising the step of:
engaging a couplable jack engaging portion of a couplable jack with a couplable jack receiving portion of the removable towing coupler thereby removably coupling the couplable jack to the removable towing coupler; and
selectively rotating the couplable jack in a range of at least 180°.

16. The method of claim 15, further comprising the step of selectively anchoring the couplable jack in at least one selective anchoring orientation of 0°, 90°, or 180°, relative to the removable towing coupler, wherein selectively anchoring comprises aligning a set of couplable jack receiving portion openings with a set of couplable jack engaging portion openings, and inserting a couplable jack lock within the couplable jack receiving portion openings and the couplable jack engaging portion openings when the couplable jack receiving portion openings and the couplable jack engaging portion openings are aligned.

17. A removable towing coupler, the removable towing coupler defining a hitch receiver end, an opposing proximal end, and a couplable jack receiving portion, wherein the hitch receiver end is configured to be removably nested within a hitch receiver of a towed vehicle, and defines a set of towing coupler openings, the set of towing coupler openings aligning with a set of hitch receiver openings when the hitch receiver end is nested within the hitch receiver of the towed vehicle, and receiving a towing coupler lock therethrough when aligned with the set of hitch receiver openings, and
wherein the couplable jack receiving portion receives a couplable jack, and is oriented intermediate to the hitch receiver end and the proximal end, and extends outwardly from a lateral aspect of the removable towing coupler; and
a couplable jack, wherein the couplable jack is received by the couplable jack receiving portion in a way that permits selective rotation of the couplable jack, the selective rotation permitted providing a range of rotation of the couplable lack of at least 180° relative to the couplable jack receiving portion.

18. A towing attachment assembly comprising:
a removable towing coupler, the removable towing coupler defining a hitch receiver end and a hitch coupling end, wherein the hitch receiver end is configured to be removably nested within a hitch receiver of a towed vehicle, and defines a set of towing coupler openings, the set of towing coupler openings aligning with a set of hitch receiver openings when the hitch receiver end is nested within the hitch receiver of the towed vehicle, and receiving a towing coupler lock therethrough when aligned with the set of hitch receiver openings, and wherein the hitch coupling end comprises a selectively dis-engageable coupling mechanism configured to be selectively dis-engaged from the removable towing coupler and to be coupled with a trailer hitch of a towing vehicle;
a towing coupler lock that secures the hitch receiver end within the hitch receiver, wherein the towing coupler lock comprises a hitch pin that is inserted within the set of towing coupler openings and the set of hitch receiver openings when the set of towing coupler openings and the set of hitch receiver openings are aligned, and a locking portion that engages the hitch pin such that the hitch pin cannot be removed from the set of towing coupler openings and the set of hitch receiver openings without first disengaging the locking portion;
a couplable jack receiving portion, wherein the couplable jack receiving portion receives a couplable jack and is oriented intermediate to the hitch receiver end and the hitch coupling end and extends outwardly from a lateral aspect of the removable towing coupler; and
a couplable jack that is removably coupled to the removable towing coupler, wherein the couplable jack is selectively rotatable when the couplable jack is coupled to the removable towing coupler, and wherein the couplable jack is selectively rotatable in a range of at least 180° relative to the removable towing coupler.

19. A method of using a towing attachment assembly, the method comprising the steps of:
- aligning a hitch receiver end of a removable towing coupler with a hitch receiver of a towed vehicle such that the removable towing coupler may be nested within the hitch receiver;
- inserting the hitch receiver end of the removable towing coupler into the hitch receiver of the towed vehicle so that the hitch receiver end is removably nested within the hitch receiver of the towed vehicle, and so that a set of towing coupler openings defined by the removable towing coupler are aligned with a set of hitch receiver openings defined by the hitch receiver;
- inserting a towing coupler lock within the set of towing coupler openings and the set of hitch receiver openings, when the set of towing coupler openings and the set of hitch receiver openings are aligned, in order to secure the hitch receiver end within the hitch receiver;
- engaging a couplable jack engaging portion of a couplable jack with a couplable jack receiving portion of the removable towing coupler thereby removably coupling the couplable jack to the removable towing coupler; and
- selectively rotating the couplable jack in a range of at least 180°.

* * * * *

UNITED STATES PATENT AND TRADEMARK OFFICE
CERTIFICATE OF CORRECTION

PATENT NO. : 11,400,777 B2  
APPLICATION NO. : 16/944981  
DATED : August 2, 2022  
INVENTOR(S) : Mataele et al.

Page 1 of 1

It is certified that error appears in the above-identified patent and that said Letters Patent is hereby corrected as shown below:

In the Claims

<u>Column 14</u>
Line 32, in Claim 17, "lack" should read --jack--

Signed and Sealed this
Eleventh Day of October, 2022

Katherine Kelly Vidal
*Director of the United States Patent and Trademark Office*